United States Patent [19]
Weingarten et al.

[11] Patent Number: 5,431,228
[45] Date of Patent: Jul. 11, 1995

[54] DOWNHOLE GAS-LIQUID SEPARATOR FOR WELLS

[75] Inventors: Jean S. Weingarten; M. Jane Williamson, both of Anchorage, Ak.; Miroslav M. Kolpak, Plano; Richard L. Payne, McKinney, both of Tex.

[73] Assignee: Atlantic Richfield Company, Los Angeles, Calif.

[21] Appl. No.: 345,224

[22] Filed: Nov. 28, 1994

Related U.S. Application Data

[63] Continuation of Ser. No. 53,581, Apr. 27, 1993, abandoned.

[51] Int. Cl.⁶ .............................. E21B 43/38
[52] U.S. Cl. ........................ 166/357; 166/265; 166/69; 166/169
[58] Field of Search .......... 166/105.5, 357, 265, 166/69, 169, 243

[56] References Cited

U.S. PATENT DOCUMENTS

| | | | |
|---|---|---|---|
| 1,279,758 | 9/1918 | Putnam | 166/105.5 X |
| 1,628,900 | 5/1927 | Neilsen | 166/105.5 |
| 2,349,164 | 5/1944 | Gilbert | 166/105.5 |
| 2,398,339 | 4/1946 | Watts | 166/105.5 |
| 2,652,130 | 9/1953 | Ferguson | 166/265 X |
| 2,843,053 | 7/1958 | Carle | 166/105.5 X |
| 3,048,122 | 8/1962 | Hansen | 166/105.5 |
| 3,128,719 | 4/1964 | Jongbloed et al. | 166/105.5 |
| 3,516,490 | 6/1970 | Smalling et al. | 166/357 |
| 4,481,020 | 11/1984 | Lee et al. | 166/105.5 X |
| 4,981,175 | 1/1991 | Powers | 166/265 |

Primary Examiner—Roger J. Schoeppel
Attorney, Agent, or Firm—Michael E. Martin

[57] ABSTRACT

A downhole gas-liquid separator for multiphase fluid producing wells includes a tubular member with a spiral baffle disposed therein and a duct including an inlet disposed adjacent the discharge end of the spiral baffle. Fluid flow into the separator undergoes substantial gas and liquid separation by centrifugal forces imposed on the liquid as it progresses through the spiral flowpath. Gas is drawn off at the discharge end of the spiral baffle and discharged into the wellbore annulus while liquid and a small amount of gas pass on through the separator and the production tubing to the surface. The spiral baffle may be disposed in the wellbore between the distal end of the production tubing string and the point of entry of gas and liquid into the wellbore. The separator may include a retrievable tubular body inserted in a ported nipple interposed in the tubing string.

9 Claims, 4 Drawing Sheets

DOWNHOLE GAS-LIQUID SEPARATOR FOR WELLS

This is a continuation of application Ser. No. 08/053,581 filed on Apr. 27, 1993, now abandoned.

BACKGROUND OF THE INVENTION

1. Field of the Invention

The present invention pertains to a downhole gas-liquid separator device insertable in a wellbore and characterized by centrifugal separation inducing spiral baffles and a cross-over duct for directing the flow of gas up the wellbore annulus.

2. Background

In certain wells which produce hydrocarbon liquids, for example, the amount of gas entering the well and entrained in the liquid entering the well may be significant. Subterranean reservoirs which are subjected to pressurized gas injection to stimulate oil flow may produce gas commingled with the oil or gas may migrate to the production wells and flow into the wells at perforations spaced from the perforations which are producing primarily liquids. If the gas and liquid are required to be produced to the surface through the same conduit, elaborate separation and treatment facilities usually must be provided, which may require substantial reduction of the gas pressure during treatment thereof and thereby requiring costly recompression of the gas for transport or reinjection processes.

U.S. patent application Ser. No. 08/020,524, filed Feb. 19, 1993 to Jean S. Weingarten, et al, and assigned to the assignee of the present invention, now U.S. Pat. No. 5,343,945 describes certain systems for separating gas and oil in a wellbore and for transporting the separated gas and oil to the surface through the wellbore annulus and through a production tubing string, respectively. However, many wells which initially produce largely gas or liquid without much production of the other phase are structurally configured for production of the dominant phase and the original completion structure for the well is not easily adapted for downhole gas-liquid separation. Later in the life of the well, the increased production of mixed phase flow presents the aforementioned treatment problems. Of course, it is highly desirable to effect downhole separation of gas and oil without major refitting of the wellbore structural components. However, with the present invention, anticipation of expected conversion or installation of a separator device can be carried out with minimal cost and a separator device installed later in the production life of the well. It is with a view to solving this type of problem in downhole gas-liquid separator systems that the present invention has been developed which provides a unique solution to downhole gas and liquid separation in fluid production wells.

SUMMARY OF THE INVENTION

The present invention provides a unique downhole system and device for separating gas and liquid in an oil production well and the like.

In accordance with one important aspect of the present invention, a downhole gas-liquid separator device is provided which is insertable in a production tubing string at the lower distal end thereof for receiving a flowstream of liquid entrained in gas, for effectively separating a substantial amount of liquid from gas and for conducting gas and a small amount of liquid into one flowpath to the surface while conducting most of the produced liquid into a separate flowpath leading to the surface.

In accordance with yet another aspect of the present invention, a downhole gas-oil separator device is provided which includes a member insertable in a production tubing string and having spiral auger flights or baffles which induce centrifugal forces on a mixed phase flowstream to cause liquid droplets to migrate to the radial extremity of the flowpath while allowing gas to pass through the device in a generally central portion of the flowpath with respect to the central axis of the device. A cross-over conduit is provided at the outlet end of the device for diverting the flow of gas into the wellbore annulus while allowing the liquid flow to continue upwardly through the production tubing string. Alternate embodiments of the invention provide for improved separation of gas from liquid by imposing a significant change in direction for gas flow before it enters the wellbore annulus.

In accordance with yet a further aspect of the present invention, an arrangement is provided for separating gas and liquid downhole in a wellbore which includes a sliding sleeve or ported sub mechanism interposed in a production tubing string which is activated to provide a gas flowpath into the wellbore annulus upon insertion of a gas-liquid separator device into the tubing string below the ported sub.

The present invention still further provides a gas-liquid separator for insertion in a well which provides for effective separation of gas and liquid with minimum pressure loss in the fluid flowstreams.

Those skilled in the art will recognize the above-mentioned advantages and features of the present invention, together with other superior aspects thereof upon reading the detailed description which follows in conjunction with the drawing.

DESCRIPTION OF PREFERRED EMBODIMENTS

Figure 1:
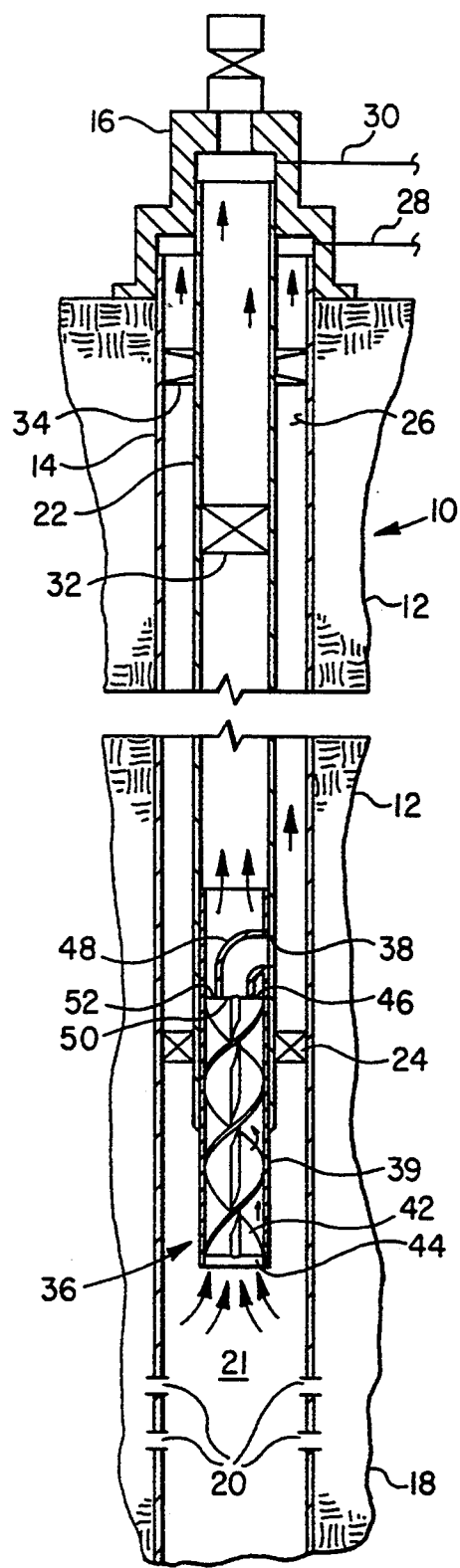
FIG. 1 is a vertical, central section view, in somewhat schematic form, of a fluid producing well including one embodiment of a gas-liquid separator in accordance with the present invention.

In the description which follows, like parts are marked throughout the specification and drawing with the same reference numerals, respectively. The drawing figures are not necessarily to scale and certain features of the invention are shown in somewhat schematic or generalized form in the interest of clarity and conciseness.

Referring to FIG. 1, there is illustrated a well, generally designated by the numeral 10, extending into an earth formation 12. The well 10 is provided with a conventional casing 14 extending from a wellhead 16 to a fluid producing zone 18 of the formation 12. The casing 14 is suitably perforated at 20 to allow fluid comprising a gas and liquid mixture to enter into the wellbore space 21. A production fluid tubing string 22 extends from the wellhead 16 into the space 21 and the space 21 is delimited at its upper end by a conventional oil well packer 24. An annular space 26 above the packer 24 extends to the wellhead 16 and fluid, primarily gas, flowing through the space 26 may be taken off from the wellhead 16 through a suitable conduit 28. The remainder of the fluid, primarily liquid, flows through the tubing string 22 to the wellhead 16 and is taken therefrom by way of a conduit 30 in a conventional manner. Subsurface safety valves 32 and 34 are preferably provided in the tubing string 22 and in the annular space 26, respectively, as indicated. Alternatively, a storm choke or shutoff valve, not shown, could be interposed in the tubing string 22 below the packer 24.

The well 10 has been adapted to include a downhole gas-liquid separator 36 comprising a generally tubular body member 39 insertable into the well through the tubing string 22 and disposed to receive a gas-liquid mixture flowing through the space 21 to the separator. The tubing string 22 is preferably modified to include a port or opening 38 into the annular space 26 above the packer 24. This opening may be provided in a tubing section, not shown in detail, comprising a side pocket mandrel, a ported nipple or a sliding sleeve type device, all commonly known in the art of wellbore structures. Alternatively, the port 38 may be formed by perforating the tubing string 22 using conventional methods.

Figure 2:
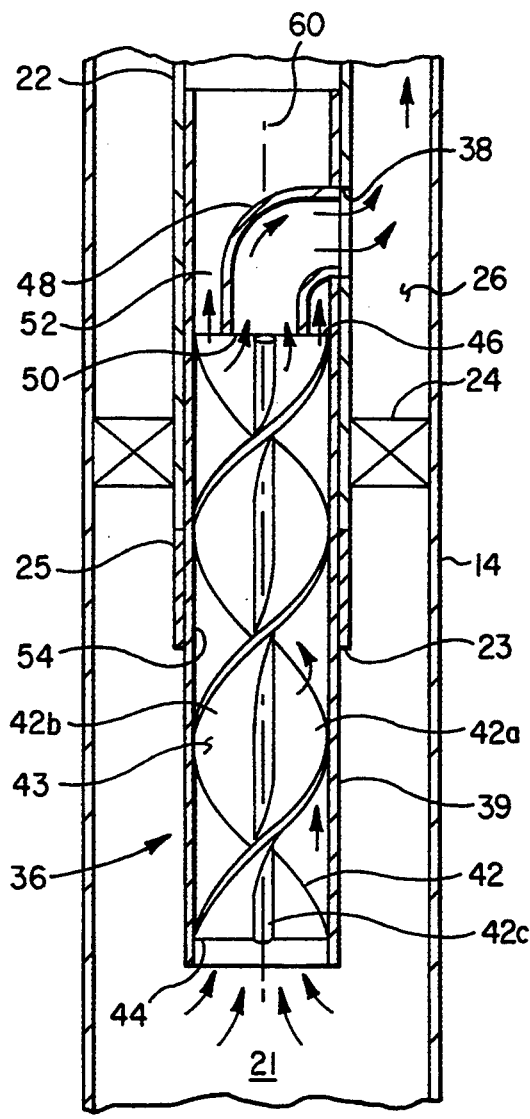
FIG. 2 is a detail section view of the gas-liquid separator of FIG. 1 shown on a larger scale.

The separator 36 includes a generally spiral baffle 42 which extends across the inner diameter of the tube 39 and includes plural turns, as illustrated. The baffle 42 has an inlet end 44 and an exit or discharge end 46 which is disposed generally contiguous with a curved conduit or duct 48 having a centrally disposed inlet end 50 and an exit end in registration with the opening 38. The baffle 42 may be made of a single twisted plate or separate plates 42a and 42b suitably secured to a central support rod 42c, as shown in FIG. 2. A generally annular passageway 52 is formed between the inlet 50 of the duct 48 and the inner wall of the body member 39.

A mixed phase fluid flowstream, gas and liquid, flowing through the space 21 and entering the separator 36 is subjected to spiral flow due to the baffle 42. Centrifugal force acting on the liquid phase of the mixed phase flowstream will cause the more dense liquid phase to flow toward the inner wall surface 54 of the tube 39 as the flowstream progresses through the spiral passageway 43 formed by the baffle 42. With the appropriate number of turns of the spiral baffle 42, a sufficient amount of separation of gas from liquid occurs wherein the gas remains generally within the central core portion of the passage 43 which is coaxial with the central longitudinal axis 60, FIG. 2, of the separator 36. The axis 60 is also typically the central longitudinal axis of the tubing string 22 and the duct inlet 50. Accordingly, when the flowstream reaches the discharge end 46 of the spiral baffle 42, substantial separation of liquid from gas has occurred and gas will flow into the duct 48, through the opening 38 and into the annular space 26 while liquid is substantially confined to the annular passage 52 formed between the duct 48 and the inner wall 54 of the body member 39.

The liquid flowstream will continue upwardly through the body member 39 and into the interior of the tubing string 22 to be produced to the surface in a conventional manner. In this way, a very efficient and effective gas-liquid separation occurs downhole in the well 10, thereby reducing the requirement for surface disposed separation equipment. The separated gas can also be reinjected into the reservoir without the expense of recompression required with conventional fluid handling systems. Pipelining requirements to and from fluid handling facilities are also reduced. Moreover, reduction of the required gas handling capacity of existing separation systems will enable more wells to remain in production.

The separator 36 may be predisposed in the tubing string 22 at the distal end 23 thereof or inserted in the tubing string after installation of same. In this regard, the tubular body member 39 may be provided with suitable structural features which permit insertion within the interior of the tubing string 22 until it reaches a predetermined position such as controlled by a "No-go" nipple 25, for example, disposed at the distal end of the tubing string 22. The separator 36 may be inserted after it is noted that downhole separation of gas from liquid is required during the life of the well 10 and, if the gas-liquid ratio changes during operation of the well, the separator device 36 may be retrieved from the end of the tubing string 22 using conventional wellbore device insertion and removal techniques such as wireline equipment, coiled tubing conveyed equipment or the like.

Figure 3:
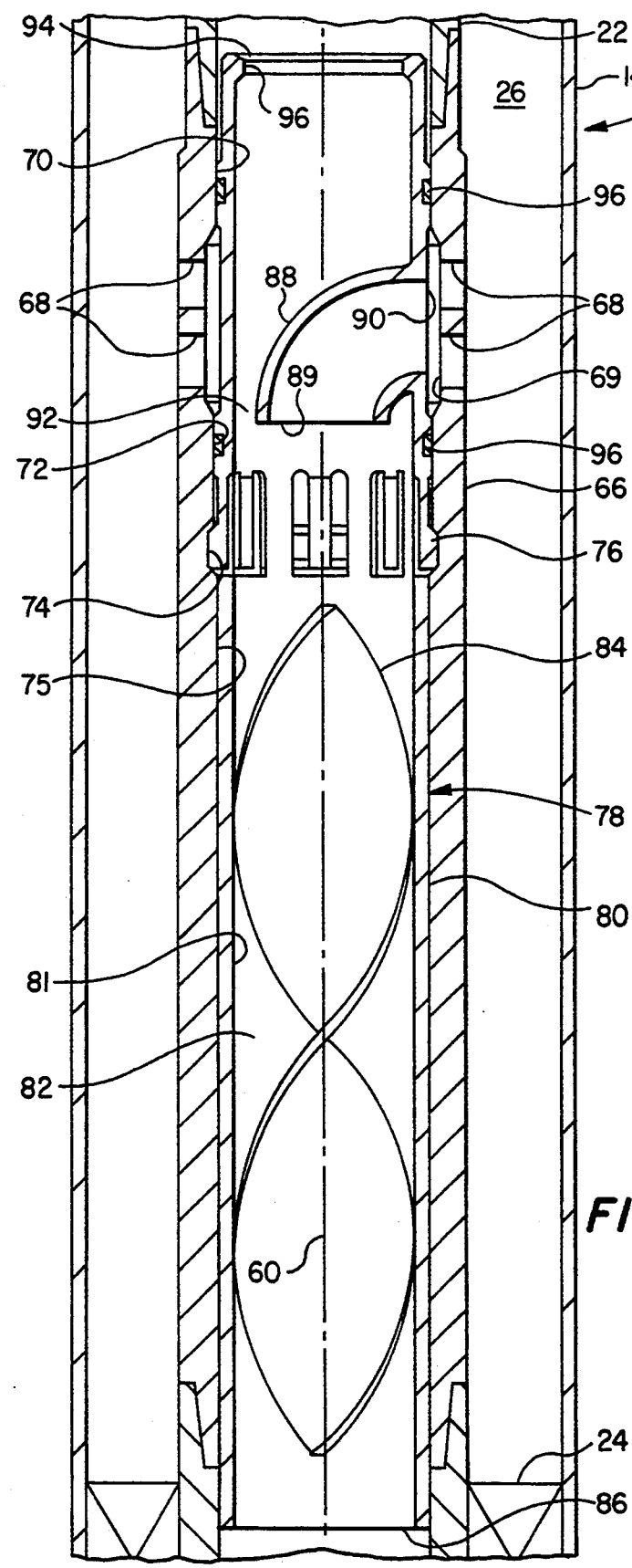
FIG. 3 is a detail central section view of a first alternate embodiment of a gas-liquid separator in accordance with the invention.

FIG. 3 illustrates, for example, a configuration of a spiral baffle gas-liquid separator device in accordance with the present invention wherein the tubing string 22 includes a ported nipple 66 interposed therein above the packer 24. The nipple 66 is a generally cylindrical tubular member having plural fluid flow ports 68 which open to the annular space 26. Spaced apart seal bores 70 and 72 are formed on opposite sides of the ports 68. A suitable recess 74 is also formed in bore 75 of the nipple 66 for receiving radially, elastically deflectable collet fingers 76 which are formed on an embodiment of a separator device in accordance with the present invention and generally designated by the numeral 78. The separator device 78 is similar to the device 36 in that a generally tubular body member 80 is provided having an interior bore 81 in which a generally spiral baffle 84 is disposed and defines a spiral passageway 82.

A fluid inlet end 86 of the device 78 is operable to receive mixed phase fluid flow from the space 21, not shown in FIG. 3, and wherein centrifugal motion is imparted to the fluid flowstream by the baffle 84 to effect centrifugal separation of gas from liquid. Upon exiting the spiral flowpath 82, the gas flowstream enters a curved duct 88, the inlet end 89 of which is spaced from the baffle 84. Gas entering the duct 88 flows through a discharge opening 90 and the ports 68 into the annular space 26. Liquid and a small amount of gas flows past the duct 88 by way of an annular flowpath 92 and passes on out of the upper end 94 of the device 78 into the interior of the tubing string 22.

The upper end 94 of device 78 is provided with a suitable reentrant flange portion 96 forming a fishing neck for retrieval of the device from the interior of the tubing string 22 using conventional fishing equipment. Spaced apart annular seals 96 are engageable with the seal bores 70 and 72 to prevent leakage of gas into the interior of the tubing string 22 above the device 78 and to prevent leakage of liquid into the annular space 26 from a point below the ports 68. The collet fingers 76 are adapted to enter the recess 74 to lock the device 78 in the ported nipple 66. The collet fingers 76 may be disposed at other positions along the length of the body member 80 for registration with a suitable recess in the nipple 66. Accordingly, the ported nipple 66 may be provided with a removable sleeve, not shown, normally blocking the ports 68, which sleeve is then replaced by the separator device 78 when the device is needed for separation of a mixed phase flowstream flowing through the tubing string 22 from the formation being produced by the well 10. The inner bore wall of the ported nipple 66 is suitably relieved at 69 to provide a flowpath between the discharge end of the duct 88 and the ports 68 regardless of the angular orientation of the device 78 with respect to the longitudinal central axis 60. In this respect also, the ports 68 are provided in sufficient number circumferentially spaced around the tube 66 to provide sufficient flow area for gas exiting the interior of the device 78 by way of the duct 88.

Figure 4:
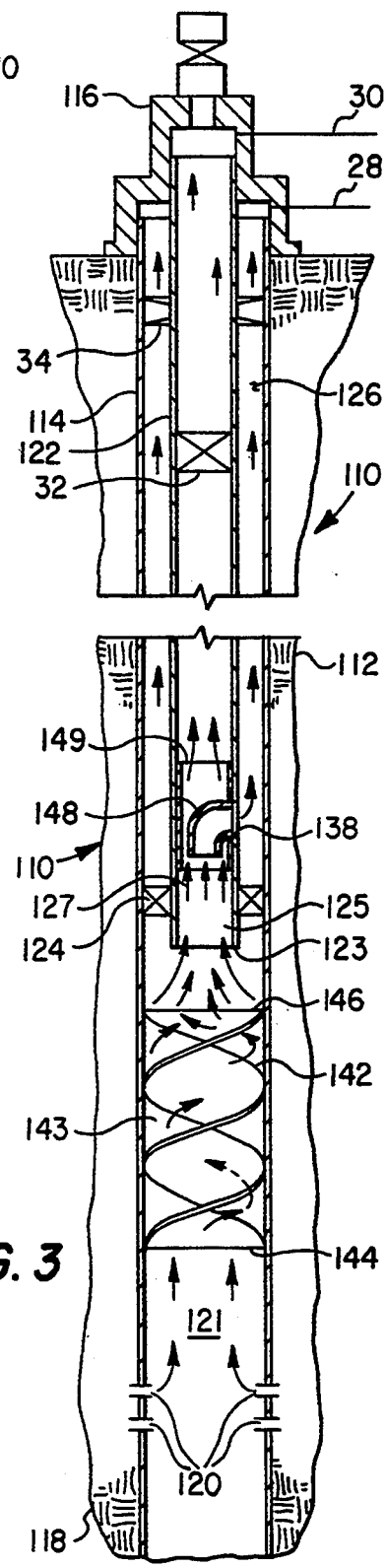
FIG. 4 is a central section view of a well showing a second alternate embodiment of a gas-liquid separator in accordance with the invention.

Referring now to FIG. 4, there is illustrated yet another embodiment of the present invention characterized by a well 110 including a casing 114 extending within a formation 112 having a fluid producing zone 118 which produces mixed phase fluid into the wellbore space 121 through perforations 120. A tubing string 122 extends from a wellhead 116 and delimits an annular passage 126 between the wellhead 116 and a packer 124. Subsurface safety valves 32 and 34 are provided in the tubing 122 and the annular space 126, respectively. The well 110 has been completed assuming that a mixture of gas and liquid would be produced into the space 121 during a substantial portion of the life of the well. In this regard a spiral baffle 142 is installed in the casing 14 and provides a spiral flowpath 143 from an inlet end 144 to a discharge end 146 of the baffle. The discharge end 146 is spaced from the lower distal end 123 of the tubing string 122 a sufficient distance to permit the centrifuged flowstream of separated gas and liquid leaving the discharge end of the baffle to become radially constricted and flow into the interior passage 125 of the tubing string 122.

A crossover duct 148 is disposed in the interior of the tubing string 122 above the distal end 123 for directing the flow of gas from the passage 125 through a side opening 138 formed in the tubing string 122 and into the annular space 126. At the same time, centrifugally separated liquid flows through annular passage 127 between the inner wall of the tubing string 122 and the duct 148 and through the interior of the tubing string 122 to the surface in the same manner as the embodiments of FIGS. 1 and 3 operate. The crossover duct 148 may be provided as part of a separate tubular insert 149 which may be inserted in the tubing string 122 or originally formed as part of the tubing string 122.

Moreover, the spiral baffle 142 could be configured to be of a collapsible type which might be inserted into its working position through the tubing string 122 and then expanded to extend substantially across the diameter of the passage 121 defined by the cylindrical casing 114. One advantage of the spiral baffle 142 is that, by providing the baffle to occupy a larger diameter flowpath, reduced friction pressure losses are encountered by the fluid flowstream as it flows through the baffle while, at the same time, as the flowstream leaves the discharge end of the baffle 146 and enters the reduced diameter passage 125 defined by the tubing string 122, the liquid particles are accelerated in their spiral flowpath to force them radially outwardly within the confines of the tubing string 122 to provide even more effective gas-liquid separation.

Figure 5:
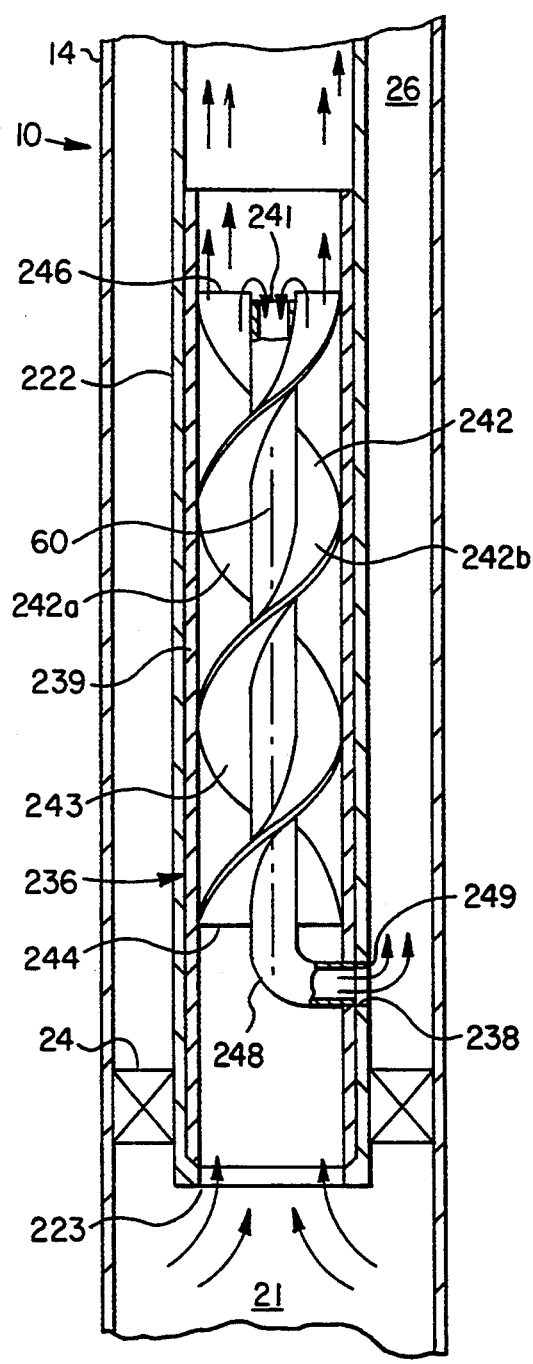
FIG. 5 is a view similar to FIGS. 2 and 4 showing a third alternate embodiment of a gas-liquid separator.

Referring now to FIG. 5, there is illustrated, in somewhat schematic form, a third alternate embodiment of the gas-liquid separator of the present invention disposed in the well 10. A modified tubing string 222 is interposed in the well and is cooperative with a packer 24 to define the wellbore space 21 and annulus space 26. A gas-liquid separator 236 is disposed in the tubing 222 suitably secured therein and retrievable therefrom in a manner, for example, similar to the arrangement of the embodiment of FIG. 3, A port 238 opens from the tubing string 222 into the annulus 26. The port 238 is in communication with a duct 248 which has a portion coaxial with and extending within the tubular body member 239 of the separator 236. The duct 248 has an inlet end 241 at the upper or discharge end of a spiral baffle 242 for admitting gas into the duct and for flow through the duct to its discharge end 249. The baffle 242 is formed by two opposed baffle plates 242a and 242b which are wrapped around and contiguous with the duct 248. A gas-liquid mixture entering the separator 236 by way of the lower distal end 223 of the tubing 222 undergoes centrifugal separation as it flows through the spiral flow space 243 defined in part by the baffle 242. Gas flow remains generally centrally disposed in the flowpath while liquid is thrown to the radial outermost portion of the flowpath limited by the tubular body 239. The gas flowstream also undergoes a reversal in direction as it enters the duct 248 at the inlet 241 which will aid in further separation and reduction of liquid carryover into the duct and into the annulus 26. Liquid flow exiting the discharge end 246 of the separator 236 flows on up thorugh the tubing string 222 to the surface.

Figure 6:
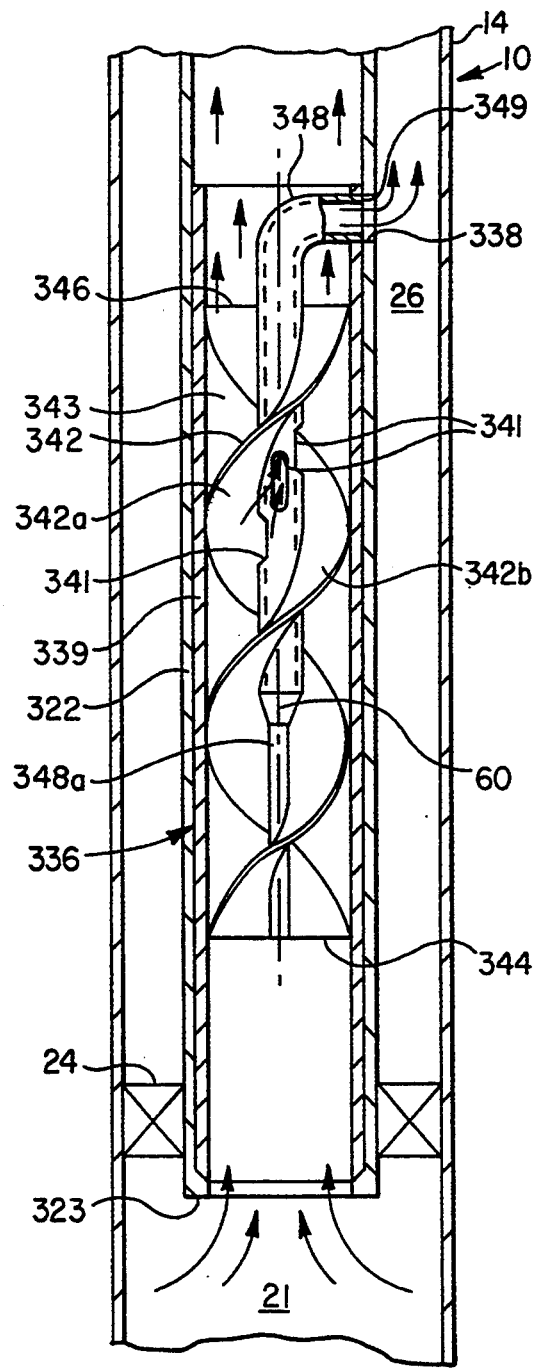
FIG. 6 is a view similar to FIG. 5 showing a fourth alternate embodiment.

FIG. 6 illustrates, somewhat schematically, yet a fourth alternate embodiment of a spiral baffle type gas-liquid separator device in accordance with the present invention and generally designated by the numeral 336. In the arrangement of FIG. 6, the well 10 is configured to have a tubing string 322 disposed therein and cooperable with a packer 24 to define the space 21 and annulus 26. A port 338 is formed in the tubing string 322 to be in communication with a gas flow duct 348 which is in communication with the port when the device 336 is disposed in the tubing string 322 as illustrated. The device 336 may also include means operable to secure the device in the tubing string 322 in a manner like that of the embodiment shown in FIG. 3. The duct 348 includes a discharge end 349 which is in communication with the port 338 and a portion which is coaxial with the central longitudinal axis 60 of a tubular body member 339 of the device 336. A spiral baffle 342 comprises opposed spiral baffle plates 342a and 342b disposed around the duct 348 for inducing centrifugal forces on a gas-liquid mixture flowing through the space 343. The lower end of the duct 348 is reduced in diameter, and may comprise a solid rod portion 348a, to present less resistance to fluid flow through the device 336. Plural, helically staggered, gas inlet ports 341 are formed in the duct near the fluid discharge end 346 of the baffle 342 wherein gas flowing along and near the duct will flow into the duct through such ports and out through the discharge end 349 of the duct into the annulus 26. Liquid, which responds to centrifugal forces acting thereon due to the spiral baffle 342, will flow on up through the tubing string 322 in a manner similar to that described for the embodiments illustrated in conjunction with FIGS. 2 through 5. The change in direction of flow of gas entering the ports 341 also advantageously effects further separation of liquid from the gas flowstream and reduces liquid flow into the duct 348 and the annulus 26.

The veracity of the spiral flow inducing spiral baffle type gas-liquid separator according to the present invention may be confirmed by pressure loss and separation calculations by approximating pressure loss coefficients and drag coefficients for fall velocities of liquid droplets of predetermined sizes such as diameters of 100 microns and 200 microns. To simplify the calculations, it was assumed that fully developed boundary layers exist and perfectly spiral streamlines exist for flow through the embodiments of the separator device described herein.

Figure 7:
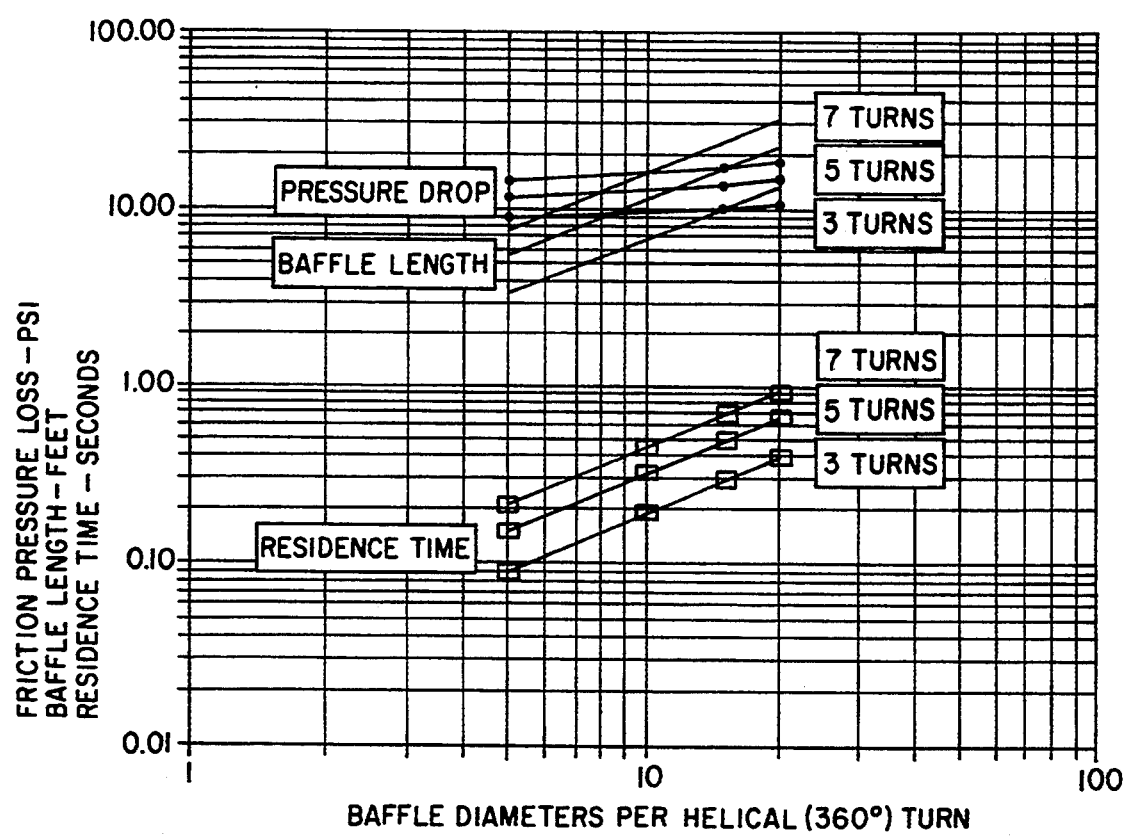
FIG. 7 is a diagram showing certain operating and geometric parameters of a device in accordance with the present invention.

Table I below gives the properties of the fluids and the geometry of the separator device 36, by way of example. The total friction pressure loss encountered in the fluid flowpath through the device at the conditions stated is approximately 11 psi. FIG. 5 shows the friction pressure losses, spiral baffle length and residence time of fluids in the device 36 having the dimensions indicated in Table I but for the variables plotted in FIG. 5 for a gas flow rate of 20 million standard cubic feet per day and a liquid flow rate of 2200 barrels per day (42 U.S. gallons per barrel). The gas is assumed to be natural gas and the liquid is assumed to be 27 API gravity crude oil at a temperature of 150° F. FIG. 7 indicates friction pressure loss in psi, baffle length in feet and residence time in seconds of fluid flow through the separator device versus the spiral baffle diameter per complete 360° turn or helical twist for baffles having 3, 5, and 7 complete turns for a device having the dimensions indicated in Table I except for the variables of baffle length and baffle turns. FIG. 5 indicates, inter alia, a sensitivity of friction pressure loss to the number of baffle turns for a given baffle diameter per turn.

TABLE I

|  | Liquid |  | Gas |  | Mixture |  |
| --- | --- | --- | --- | --- | --- | --- |
| vol. rates | 2200 | BPD | 20 | MMSCFD |  |  |
| gravity | 27 | API | 0.76 | vs. air |  |  |
| viscosity | 15 | cp | .0258 | cp |  |  |
| pressure |  |  | 2500 | psia |  |  |
| temperature |  |  | 150 | F |  |  |
| compress. factor |  |  | 0.72 |  |  |  |
| watercut | 0.2 |  |  |  |  |  |
| densities | 57.05 | lb/ft.$^3$ | 11.65 | lb/ft.$^3$ | 16.67 | lb/ft.$^3$ |
| velocities | 3.79 | ft/s | 30.51 | ft/s | 34.31 | ft/s |
| baffle thickness | 0.125 | in | liq. fraction | | 0.11 | |
| rod dia. | 0.50 | in | length/turn | | 4.58 | ft |
| # baffle turns | 3 | | turns/sec | | 7.48 | 1/s |
| # dias./turn | 20 | | $(N/2)^2 + 1$ | | 101 | |
| roughness | 0.0001 | ft | spiral flow area | | 0.0377 | ft.$^2$ |
| tubing ID | 2.75 | in | exit flow area | | 0.0167 | ft.$^2$ |
| tubing OD | 3.50 | in | ann. flow area | | 0.3750 | ft.$^2$ |
| exit tubing ID | 1.75 | in | total length | | 13.75 | ft |
| casing ID | 9.00 | in | residence time | | 0.401 | s |
| exit flow fraction | 0.50 | | acceleration | | 4.61 | g |
| baffle velocity head | 2.12 | psi | req'd fall velocity | | 0.23 | ft/s |

The separator devices described above may be constructed using conventional materials and engineering practices for downhole well equipment and devices and the calculations may be carried out using known principles of fluid mechanics. Although exemplary downhole separator devices in accordance with the present invention have been described in some detail herein, those skilled in the art will recognize that various substitutions and modifications may be made to the device without departing from the scope and spirit of the invention as set forth in the appended claims.

What is claimed is:

1. A gas-liquid separator device for a well producing both liquid and gas, said well including a tubing string extending within a wellbore and in fluid flow communication with a wellbore space, a packer defining a seal between said tubing string and the wall of said wellbore and delimiting an annular space in said wellbore for conducting gas to the surface, and an opening for communicating gas from said wellbore space to said annular space, said separator device comprising:

a generally spiral shaped baffle interposed in a tubular body connected at its first end to said tubing string and in communication with said wellbore space through its second end and with said opening for permitting spiral flow of a gas-liquid mixture upwardly through a generally spiral flowpath defined by said baffle to effect separation of liquid and gas by causing liquid to migrate to the radial extremities of said flowpath and flow upwardly through a fluid discharge end of said baffle and allowing gas to pass generally centrally upwardly along said flowpath; and a duct interposed in said tubular body adjacent to a said fluid discharge end of said baffle for directing the flow of gas through said opening into said annular space, said duct being disposed to receive gas flowing upwardly in a central flowpath coaxial with the longitudinal central axis of said tubular body and for redirecting said gas through said opening into said annular space.

2. The invention set forth in claim 1 wherein:
said tubular body includes lock means registrable with cooperating means on said tubing string for locking said tubular body in a predetermined position in said tubing string.

3. The invention set forth in claim 2 wherein:
said tubing string includes a ported nipple member for receiving said separator device and for releasably locking said separator in said tubing string with a discharge end of said duct in registration with ports formed in said nipple for communicating gas into said annular space.

4. The separator device of claim 1 wherein said duct comprises a gas inlet adjacent the discharge end of said baffle and a gas outlet into said annular space spaced from said gas inlet toward an inlet end of said baffle to cause gas flowing into and through said duct to undergo a substantial change in direction.

5. A separator apparatus for insertion of a gas-liquid separator in a tubing string of a fluid producing well, said separator comprising:
an elongated tubular body including a central bore forming a passage extending from a first end of said tubular body to a second end of said tubular body;
a spiral baffle disposed in said body and defining a spiral flowpath for a gas-liquid mixture entering said second end of said body;
a duct interposed in said body for conducting gas exiting said spiral flowpath out of said body; said apparatus comprising
means for registering a first end said body with said tubing string at a predetermined point in said tubing string for communicating gas through said duct into an annular space in said well; and
a ported nipple positioned on said tubing string to receive said separator in a predetermined position therein for placing said duct in communication with ports formed in said nipple for conducting gas from the interior of said body into said annular space.

6. The invention set forth in claim 5 wherein:
said body includes means engageable with at least one of an insertion and retrieval member for moving said body to a predetermined position in said tubing string.

7. The invention set forth in claim 5 wherein:
said means for registering said body with said tubing string comprises flexible collet fingers engageable with collect receiving recess means in said tubing string for positioning said separator in a predetermined position in said tubing string.

8. A gas-liquid separator device for a well producing both liquid and gas, said well including a tubing string extending within a wellbore and in fluid flow communication with a wellbore space, a packer defining a seal between said tubing string and the wall of said wellbore and delimiting an annular space in said wellbore for conducting gas to the surface, and an opening in said tubing string for communicating gas from said wellbore space to said annular space, said separator device comprising:
a generally spiral shaped baffle interposed in said wellbore space for inducing spiral flow of a gas-liquid mixture upwardly through a flowpath through said baffle and into said tubing string to effect separation of liquid and gas by causing liquid to migrate to the radial extremities of said flowpath and allowing gas to pass centrally along said flowpath; and
a duct disposed in said tubing string for directing the flow of gas through said opening into said annular space, said duct being disposed to receive gas flowing in a generally central axial flowpath through said tubing string.

9. A gas-liquid separator device for a well producing both liquid and gas, said well including a tubing string extending within a wellbore and in fluid flow communication with a wellbore space, a packer defining a seal between said tubing string and the wall of said wellbore and delimiting an annular space in said wellbore for conducting gas to the surface, and an opening in said tubing string for communicating gas from said wellbore space to said annular space, said separator device comprising:
a generally spiral shaped baffle interposed in said tubing string and in communication with said wellbore space and with said opening in said tubing string for inducing spiral flow of a gas-liquid mixture upwardly through a generally spiral flowpath defined to effect separation of liquid and gas by causing liquid to migrate to the radial extremities of said flowpath and flow upwardly through a fluid discharge end of said baffle and allowing gas to pass generally centrally along said flowpath; and
a duct coaxial with said baffle and disposed centrally of said flowpath for directing the flow of gas through said opening into said annular space, said duct including at least one gas inlet port interposed between an inlet end and said discharge end of said baffle and operable to receive gas flow through a space defined in part by said baffle and to effect a change in direction of said gas flow upon entering said duct.

* * * * *